United States Patent
Tillet et al.

(10) Patent No.: US 10,455,373 B2
(45) Date of Patent: *Oct. 22, 2019

(54) PRIORITY TALKGROUPS

(71) Applicant: IRIDIUM SATELLITE LLC, McLean, VA (US)

(72) Inventors: Daniel Tillet, Oak Hill, VA (US); Garrett Chandler, Potomac Falls, VA (US)

(73) Assignee: Iridium Satellite LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/028,923

(22) Filed: Jul. 6, 2018

(65) Prior Publication Data
US 2018/0317057 A1 Nov. 1, 2018

Related U.S. Application Data

(63) Continuation of application No. 15/407,700, filed on Jan. 17, 2017, now Pat. No. 10,021,539, which is a
(Continued)

(51) Int. Cl.
*H04W 4/10* (2009.01)
*H04B 7/185* (2006.01)
(Continued)

(52) U.S. Cl.
CPC .......... *H04W 4/10* (2013.01); *H04B 7/18513* (2013.01); *H04W 4/08* (2013.01); *H04W 76/45* (2018.02)

(58) Field of Classification Search
CPC .......... H04W 4/06; H04W 4/08; H04W 4/10; H04W 4/18; H04W 76/005; H04B 76/18513
See application file for complete search history.

(56) References Cited

U.S. PATENT DOCUMENTS 6,564,006 B1 5/2003 Biggs et al.
6,564,066 B1 * 5/2003 Biggs .................... H04W 72/10
455/512
(Continued)

OTHER PUBLICATIONS

Wikipedia, the free encyclopedia, "Motorola Type II", https://en.wikipedia.org/wiki/Motorola_Type_II.
(Continued)

*Primary Examiner* — Dong-Chang Shiue
(74) *Attorney, Agent, or Firm* — Baker Botts L.L.P.

(57) ABSTRACT

In one implementation, a communication device comprising one or more processors is configured to participate in a plurality of talkgroups. The one or more processors are configured to receive a communication transmitted from a satellite constellation indicating that a first priority talkgroup has been assigned for the communication device and to receive one or more signal transmitted from the satellite constellation via a control channel indicating that the first priority talkgroup is active, in response to which the one or more processors may determine that the first priority talkgroup has been assigned for the communication device and that the first priority talkgroup is active. Consequently, the one or more processors may set the communication device to the first priority talkgroup such that the communication device starts receiving communications via the first priority talkgroup.

23 Claims, 11 Drawing Sheets

Related U.S. Application Data continuation of application No. 15/016,863, filed on Feb. 5, 2016, now Pat. No. 9,578,470.

(60) Provisional application No. 62/112,267, filed on Feb. 5, 2015.

(51) Int. Cl.
*H04W 4/08* (2009.01)
*H04W 76/45* (2018.01)

(56) References Cited

U.S. PATENT DOCUMENTS

| | | | | |
|---|---|---|---|---|
| 7,676,192 | B1* | 3/2010 | Wilson | H04H 60/41 |
| | | | | 455/3.01 |
| 2001/0005904 | A1 | 6/2001 | Wood | |
| 2002/0102999 | A1* | 8/2002 | Maggenti | H04L 12/1822 |
| | | | | 455/518 |
| 2003/0154249 | A1 | 8/2003 | Crockett et al. | |
| 2004/0005904 | A1* | 1/2004 | Wolf | H04W 4/08 |
| | | | | 455/519 |
| 2006/0223562 | A1* | 10/2006 | Mathis | H04W 84/08 |
| | | | | 455/518 |
| 2007/0021052 | A1 | 1/2007 | Boice | |
| 2013/0315164 | A1* | 11/2013 | Arur | H04W 76/40 |
| | | | | 370/329 |

OTHER PUBLICATIONS

Motorola Solution Data Sheet, Extending P25 to Broadband, "Unified Push-To-Talk", 2013, https://www.motorolasolutions.com/content/dam/msi/docs/en-xu/Unified_Push_to_Talk_(PTT)_Solution_Data_Sheet.pdf.

Motorola, PR1500 Portable Radio User Guide, https://www.motorolasolutions.com/content/dam/msi/docs/business/products/two-way_radios/portable_radios/wide_area_large_business_portable_radios/pr1500/_documents/static_files/6881098c40-opr1500_final_98c40-o_eng.pdf.

Motorola, ASTRO XTS 1500 Digital Portable Radio Model I User Guide, 2002, https://www.commserv.ucsb.edu/faculty_and_staff/support/xts1500.pdf.

Motorola, ASTRO XTS 5000 Digital Portable Radio Model II User Guide, http://www.gordon.army.mil/nec/documents/lmr/portable_radio.pdf.

* cited by examiner

| Device | Provisioned Talkgroups | Priority Talkgroup 1 | Priority Talkgroup 2 | Priority Talkgroup 3 | Priority Talkgroup 4 | Non-Priority Talkgroups |
|---|---|---|---|---|---|---|
| 150a | A, B, C, D, E, F, G, H, I, J | C | H | B | - | A, D, E, F, G, I, J |
| 150b | A, B, C, E, F, G, H | C | H | - | - | A, B, E, F, G |
| 150c | C, D, E, F, G, H, I, J | C | H | - | - | D, E, F, G, I, J |
| 150d | A, B, C, E, H, J | C | - | B | - | A, E, H, J |
| 150e | A, B, C, D, E, F, G, H, I, J | C | - | B | E | A, D, F, G, H, I, J |
| 150f | B, C, E, J | C | - | - | E | B, J |
| 150g | C, E, F | C | - | - | E | F |

*FIG. 5*

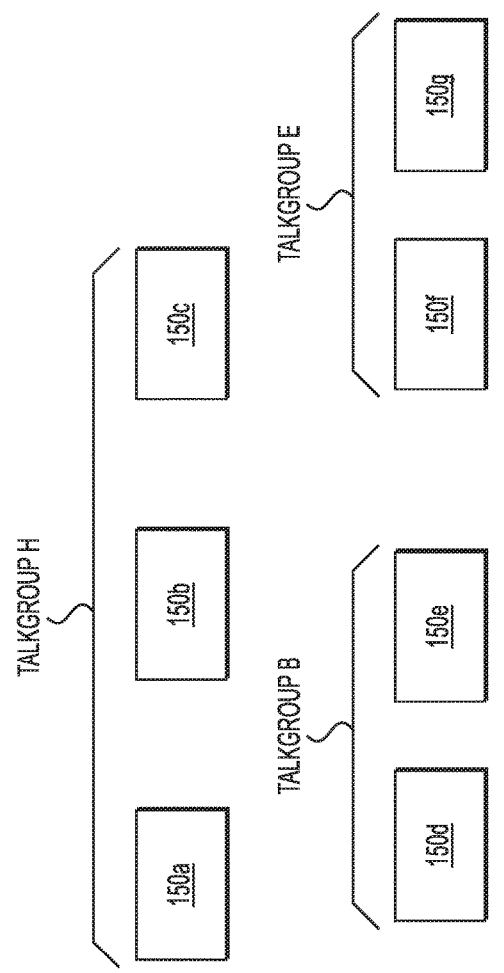

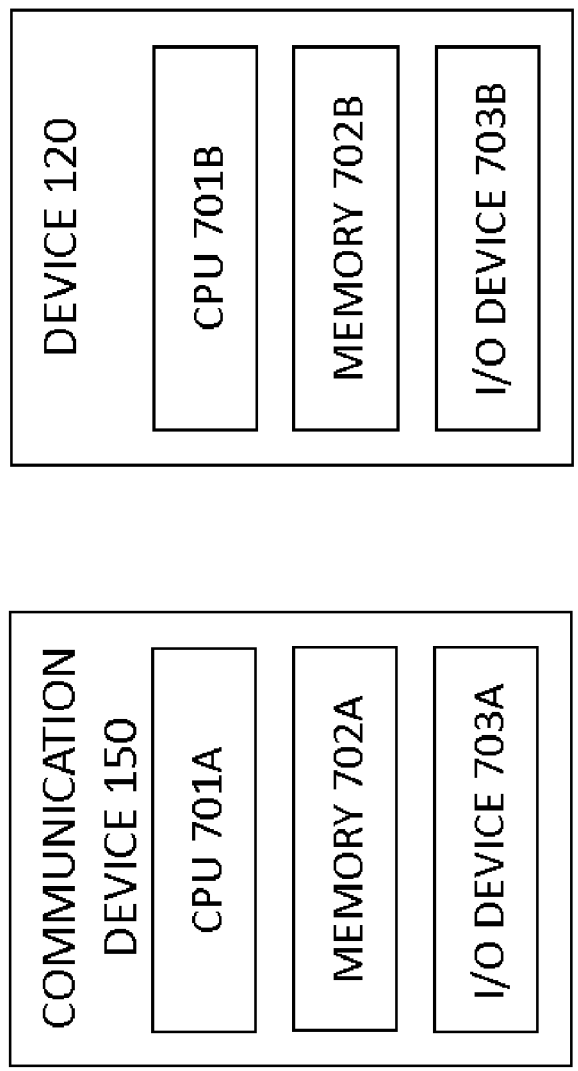

PRIORITY TALKGROUPS

CROSS-REFERENCE TO RELATED APPLICATIONS

This application is a Continuation of U.S. patent application Ser. No. 15/407,700, filed on Jan. 17, 2017, which is a Continuation of U.S. patent application Ser. No. 15/016,863, filed on Feb. 5, 2016, now U.S. Pat. No. 9,578,470, issued Feb. 21, 2017, which claims the benefit of U.S. Provisional Patent Application No. 62/112,267 filed on Feb. 5, 2015, the disclosures of each of which are incorporated herein by reference in their entirety.

TECHNICAL FIELD

The disclosure relates generally to Push-To-Talk ("PTT") communication, and more specifically to priority talkgroups in PTT communication.

SUMMARY

According to an implementation of the disclosure, a communication device comprising one or more processors is configured to participate in a plurality of talkgroups. The one or more processors are configured to receive a communication transmitted from a satellite constellation indicating that a first priority talkgroup has been assigned for the communication device and to receive one or more signal transmitted from the satellite constellation via a control channel indicating that the first priority talkgroup is active, in response to which the one or more processors may determine that the first priority talkgroup has been assigned for the communication device and that the first priority talkgroup is active. Consequently, the one or more processors may set the communication device to the first priority talkgroup such that the communication device starts receiving communications via the first priority talkgroup.

Other features of the present disclosure will be apparent in view of the following detailed description of the disclosure and the accompanying drawings. Implementations described herein, including the above-described implementation, may include a method or process, a system, or computer-readable program code embodied on computer-readable media.

BRIEF DESCRIPTION OF THE DRAWINGS

For a more complete understanding of the present disclosure, reference now is made to the following description taken in connection with the accompanying drawings.

FIG. 5 is a table showing an example implementation of the present disclosure in which a plurality of communication devices are provisioned to participate in a plurality of talkgroups and are assigned to a plurality of priority talkgroups, in accordance with particular implementations of the present disclosure.

FIG. 6D shows a result of a transition by the communication devices from the talkgroups shown in FIG. 6C to a second highest priority talkgroup of FIG. 5.

FIG. 7A is a schematic diagram of a communication device configured to participate in a satellite communication system, including, for example, a satellite-based PTT system, in accordance with particular implementations of the present disclosure; and FIG. 7B is a schematic illustration of a device configured to implement one or processes for managing communication in a satellite communication system, including, for example, a satellite-based PTT system, in accordance with particular implementations of the present disclosure.

DETAILED DESCRIPTION

Figure 1:
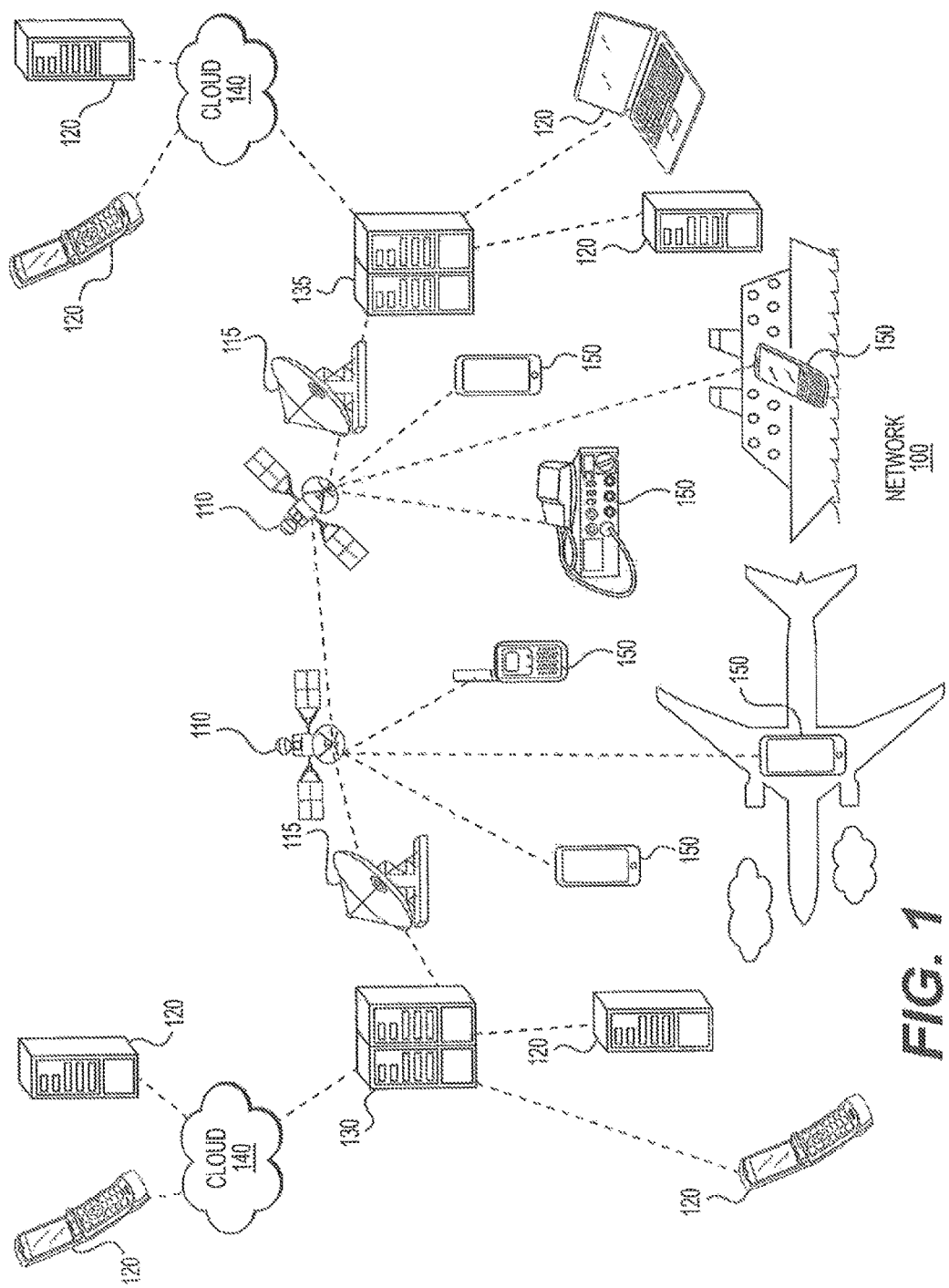
FIG. 1 is a block diagram of a network for satellite-based communications using one or more communication methods, in accordance with particular implementations of the present disclosure.

Various implementations set forth in this disclosure are described in relation to Push-To-Talk ("PTT") communication protocols implemented through a network of cross-linked satellites, but such implementations are not so limited and may be applied to many other communication protocols implemented through many other communication systems. In particular implementations set forth herein, satellite-based PTT communication may be implemented with one or more so-called "priority talkgroups" defined for some or all of the communication devices provisioned to participate in the PTT network. The definition of the priority talkgroups for any given communication device may be performed by a central administrator of PTT communication for that device (e.g., as opposed to the user of the device). Such a "priority talkgroup" may be a talkgroup that the administrator determines is more critical than other talkgroups available to the device. When the priority talkgroup for a specific device is instantiated and communication commences within that talkgroup, each device with that talkgroup assigned as the priority talkgroup may be automatically brought into the priority talkgroup's communication, regardless of the status of the device at the time. In particular implementations, the device will switch from communicating (e.g., transmitting or receiving) within a current talkgroup to listening on the priority talkgroup, even if the device user is talking on the currently set talkgroup for the device. In some implementations, the user of a device may not have the ability to change the priority talkgroup, such that assigning or reassigning the priority talkgroup for the device is solely the responsibility of the PTT administrator. The function of listening for activity on the priority talkgroup and the function of switching from the current talkgroup (or even switching from another function currently being performed by the device) to PTT communication via the priority talkgroup may be exclusively performed by the device in some implementations.

PTT users may have a need to ensure communication between specific parties during special and/or emergency circumstances. Given that PTT service is often implemented by a plurality of devices, each of which may be configured to participate in only one talkgroup at a time, there is often a need to ensure that critical communication may be initiated with target devices of the plurality of devices regardless of the current status of the target devices.

Implementations of the priority talkgroup function may permit the transmission of critical or emergency communications to functional workgroups and other user groups when desired. An example use of this capability is the creation of a man-down talkgroup that is intended for use only when a worker is in danger or incapacitated. The priority talkgroup feature may allow for the user of a device set to the priority talkgroup to communicate the worker's danger or incapacitation to all users of the priority talkgroup that are connected with the PTT communication system, for example.

The concept of priority may be network-based in some implementations of PTT. In particular, there may be a prioritization of some allocation of channels and of the creation of some talk groups over other talk groups. In other implementations, a concept referred to as "ruthless preemption" may be used. In ruthless preemption, when a preempting talkgroup is activated or when a request for resources associated with the preempting talkgroup comes in, the preempting talkgroup may trump all talkgroups, such that channels used for other talkgroups are torn down, and the preempting talkgroup commandeers the channels for its own use. Particular implementations disclosed herein may take an alternative approach to communicating with groups of users by, for example, defining priority talkgroups, which may occur at the administrator level and which may be dynamically redefined as needed.

In particular implementations disclosed herein, instead of establishing priority on the network level, priority may be established on a device level. More specifically, particular implementations may allow for a management function at the device level that defines a priority talkgroup for the device such that the device is brought into whichever talkgroup is its priority talkgroup when that talkgroup starts up. Consequently, communication may be established or terminated with priority talkgroups at a device level based on information that the device receives from a control channel that indicates which talkgroups have become active or inactive. Whenever a priority talkgroup is active, upon receiving a signal indicating that the priority talkgroup is active, the device may automatically switch from its current function or talkgroup and automatically join and listen to the priority talkgroup. Thus, particular implementations disclosed herein may be device-based as opposed to network-based.

Referring now to FIG. 1, a network 100 may facilitate communication between communication devices using one or more communication methods. Specifically, FIG. 1 illustrates a block diagram of a network for satellite-based communication using one or more communication methods. Network 100 may comprise a plurality of satellites 110, each of which may permit the exchange of information and services among devices that are connected via satellites 110. Network 100 may also comprise a plurality of satellite links 115 (e.g., Earth-based satellite dishes, vehicle-based satellite dishes, high-power transmitters and receivers, antennas, Earth terminals, teleports) that may be configured to communicate with the one or more satellites 110 and relay data back and forth with the one or more satellites 110. In certain implementations, network 100 may comprise a plurality of cross-linked satellites 110 that effectively form a network between satellites 110 across which communications can be transferred. In other implementations, for example, network 100 may comprise one or more satellites 110 and each such satellite 110 may not directly connect to another satellite 110. In such other implementations, each satellite 110 may have a "bent pipe" architecture in which satellites 110 may only connect indirectly with one another through terrestrial-based systems, for example.

In addition, network 100 may comprise one or more management centers 130 (e.g., a Network Operations Center ("NOC") and/or a gateway for interfacing the satellite-based portion of network 100 to one or more terrestrial-based portions of network 100) configured to connect to at least one of the plurality of satellites 110. A management center 130 may comprise one or more locations (e.g., devices) that may monitor, control, or manage network 100. Each management center 130 may manage and monitor one or more satellites 110. For example, management center 130 may control movement or positioning of a satellite 110, may receive and monitor communications between a satellite 110 and other devices, or may determine when satellite 110 needs maintenance. In some implementations, a dedicated management center 130 may be established for each satellite 110. Alternatively, in some other implementations, a management center 130 may manage and monitor a plurality of satellites 110. In such implementations, management center 130 may connect directly with only one satellite 110 that is within range for direct communication with management center 130 via satellite link 115, or possibly a few satellites 110 that are within range of satellite link 115, and management center 130 may indirectly manage and control other satellites 110 in network 100 through cross-linked communications between the satellite (or satellites) 110 within range of satellite link 115 and satellites 110 outside of the range for direct communication with management center 130 via satellite link 115.

In some implementations, one or more satellites 110 may maintain a geostationary orbit, and management center 130 may always directly communicate, via satellite link 115, with the same satellite 110 that always remains in a geostationary position within range for direct communication with management center 130 via satellite link 115, for example. In other implementations, one or more satellites 110 may not maintain a geostationary orbit, and management center 130 may directly communicate with different satellites 110 at different times based on which satellite 110 or satellites 110 are within range for direct communication with management center 130 via satellite link 115 at any given time. Such satellites may be Low Earth Orbiting ("LEO") satellites, for example.

Management center 130 may be connected to one or more clouds 140, which may be public clouds, private clouds, or community clouds. Each cloud 140 may permit the exchange of information and services among devices (e.g., management center 130) that are connected to such clouds 140. In certain implementations, cloud 140 may be a wide area network, such as the Internet. In some implementations, cloud 140 may be a local area network, such as an intranet. Further, cloud 140 may be a closed, private network in certain implementations, and cloud 140 may be an open network in other implementations. Cloud 140 may facilitate the transmission of information among users or devices (e.g., management center 130, devices 120) that are connected to cloud 140 through any number of communication means, such as wireless transmission of information or wired transmission of information, for example. Management center 130 may integrate signals or data from satellites 110 with terrestrial systems, such as cellular networks, the public switched telephone network ("PSTN"), and/or the Internet via cloud 140, for example.

One or more devices 120 may connect with management center 130. Such devices 120 and management center 130 may transmit data therebetween. Devices 120 may include, for example, one or more general purpose computing devices, specialized computing devices, mainframe devices, wired devices, wireless devices, monitoring devices, infrastructure devices, other devices configured to provide information to service providers and users, telephones, mobile phones, computer devices, tablet computers, personal digital assistants, routers, switches, and any other suitable communication device. In certain implementations, for example, a device 120 connected with management center 130 may function as a management center and may mange a plurality of talkgroups (described in more detail below) assigned to a plurality of devices, such as communication devices 150 (described below in more detail), or organizations. In such implementations, the device 120 may establish, for example, connection orders for such talkgroups, priority settings for such talkgroups, home settings for such talkgroups, security settings or keys for such talkgroups, or other protocols for talkgroups.

Network 100 may include a plurality of gateways 135. Gateways 135 may function similarly to management center 130, except that gateways 135 may not have rights to control satellites 110 or responsibilities to manage satellites 110. In certain implementations, gateways 135 may communicate with satellites 110 via satellite links 115. In other implementations, gateways 135 may utilize other methods requiring less infrastructure, such as low power antennas, transmitters, or receivers, to communicate with satellites 110. For example, gateways 135 may serve as bridges between satellites 110, cloud 140, and devices 120 and may permit the free (or controlled) flow of data therebetween.

Network 100 may include a plurality of communication devices 150. Similar to devices 120, communication devices 150 may include, for example, one or more general purpose computing devices, specialized computing devices, mainframe devices, wired devices, wireless devices, monitoring devices, infrastructure devices, other devices configured to provide information to service providers and users, telephones, mobile phones, computer devices, tablet computers, personal digital assistants, routers, switches, and any other suitable communication device. Communication devices 150 may be configured to collect data from or provide data to one or more data sources (e.g., servers, networks, interfaces, other devices). For example communication devices 150 may collect information from network 100, management center 130, satellite link 115, satellites 110, and other devices connected to satellites 110, such as other communication devices 150. By collecting this information, communication devices 150 may perform one or more tasks associated with talkgroups, as discussed in more detail below, and other communication methods.

More particularly, communication devices 150 may establish direct communication with satellites 110 orbiting above their terrestrial positions. Accordingly, communication devices 150 may utilize satellites 110 to establish communication with other communication devices 150, with management center 130, with cloud 140, with devices 120, with gateway 135, and with any other suitable device or system. Communication devices 150 may include features similar to those of devices 120 and may similarly communicate with management centers 130 and gateways 135 in certain implementations.

Network 100 may be configured to facilitate PTT communication. PTT communication is a method of communicating that, in some implementations, may use half-duplex communication lines in which a communication device, such as a communication device 150, switches between a dedicated transmission mode and a dedicated reception mode, for example, for the purposes of communicating with one or more other communication devices that collectively may be referred to as a talkgroup. In some implementations of PTT communication, the communication device may be in the dedicated reception mode by default and may switch to the dedicated transmission mode only while a "talk" button is pushed or otherwise activated. In other implementations of PTT communication, the communication device may switch from the dedicated reception mode to the dedicated transmission mode in response to a first trigger, such as the selection of the dedicated transmission mode on the communication device, the detection of a particular sound (e.g., a user's voice, a particular word or command, a particular tone), or the receipt of any other instruction or command to switch to the dedicated transmission mode, and the communication device may remain in the dedicated transmission mode until a second trigger occurs and the communication device switches to the dedicated reception mode in response thereto. For example, the second trigger may include the selection of the dedicated reception mode on the communication device, the lapse of a particular period of time (e.g., 30 seconds, 1 minute, 5 minutes, 30 minutes, 1 hour) in the dedicated transmission mode, the absence of a particular sound (e.g., the user's voice), the detection of a particular sound (e.g., a particular word or command, a particular tone), or the receipt of any other instruction or command to end the dedicated transmission mode or to switch to the dedicated reception mode. In some instances, when a communication device is in the dedicated transmission mode, the device may be said to "have the floor" of the talkgroup.

Throughout this disclosure, PTT communications and communications more generally are described often in the context of voice communications. However, the systems and techniques described herein are not limited to communications involving voice. Rather, the systems and techniques described herein, and particularly the priority talkgroup functionality, are more generally applicable to all forms of communication, including data communication. In fact, in some implementations, the communication devices engaging in PTT communications may not be user devices such as handsets and the like, but instead may be machine-to-machine ("M2M") or other data communication devices that, for example, generally may be referred to as facilitating the "Internet of Things" ("IoT"). For instance, the communication devices may interface with sensors or other types of data processing and/or generating devices and may be configured to participate in PTT communication sessions, for example, involving one or more other communication devices, to share data. In such implementations, the communication devices still may exchange data with other communication devices within a talkgroup using PTT techniques, and the communication devices still may employ the priority talkgroup techniques described herein. Furthermore, while the term "PTT" or "push-to-talk" may suggest that something (e.g., a button) must be "pushed" (and, in some cases, held) in order for a communication device to "take the floor" or otherwise communicate in a dedicated transmission mode in a talkgroup, that is not necessarily the case. As described herein, there are various other mechanisms through which communication devices can "take the floor" or otherwise communicate in a dedicated transmission mode in a talkgroup, particularly in implementations where the communication devices are not user devices but instead are M2M or other data communication devices.

PTT communication may facilitate communication between a plurality of devices, such as communication devices 150, by establishing communication protocols that govern which communication device 150 "has the floor" (e.g., is set to a dedicated transmission mode) and which communication device or devices 150 are listening (e.g., are set to the dedicated reception mode). Consequently, PTT communication may efficiently allocate communication roles (e.g., either being in a dedicated transmission mode or being in a dedicated reception mode) among a group of communication devices 150.

In some implementations of PTT communication, communication systems other than or in addition to half-duplex communication lines may be used. For example, some implementations of PTT communication may utilize two-way (or full) duplex communication lines in which a plurality of communication devices 150 may simultaneously be in transmission modes. In such alternative implementations, for example, users of a plurality of communication devices 150 may speak simultaneously and may all be heard by users of other communication devices 150 connected with the speaking users.

In PTT communication, communication may occur via one or more traffic channels. A traffic channel may correspond to an electromagnetic wave, such as a radio wave, of a particular frequency. A plurality of communication devices may connect to one or more traffic channel. In particular, a communication device set to the dedicated transmission mode and connected to a particular traffic channel may transmit a communication over the traffic channel, e.g., by transmitting an electromagnetic wave at the frequency corresponding to the traffic channel, to communication devices set to the dedicated reception mode or network nodes (e.g., a satellite 110) connected to the traffic channel. For example, a user may speak into a first communication device set to the dedicated transmission mode and connected to the traffic channel; the first communication device may encode the user's message in a radio signal and transmit the radio signal over the traffic channel (e.g., to a satellite); one or more second communication devices set to the dedicated reception mode and connected to the traffic channel may receive the radio signal (e.g., retransmitted by the satellite), including the encoded message, over the traffic channel; and the one or more second communication devices may output the user's message in the user's voice to the respective users of the one or more second communication devices. In this manner, a communication device set to the dedicated transmission mode and connected to the traffic channel may transmit a communication (e.g., a voice communication, Morse code, a data packet) simultaneously to all (or some subset of all) other communication devices set to the dedicated reception mode and connected to the traffic channel. As described below in more detail, PTT communication may utilize talkgroups, which function similar to the traffic channels described above but allow communication between communication devices set to a plurality of different traffic channels.

In some implementations of PTT communication, only one communication device per traffic channel may be set to the dedicated transmission mode at a time. Consequently, if a communication device connected to a traffic channel is set to the dedicated transmission mode, the other communication devices connected to the traffic channel may not switch to the dedicated transmission mode until the communication device set to the dedicated transmission mode is switched to the dedicated reception mode or otherwise deactivated, even if a first trigger for switching one of the other communication devices to the dedicated transmission mode occurs. For example, if pushing a particular button on a particular communication device is the first trigger for switching the particular communication device to the dedicated transmission mode, in such an implementation, pushing the particular button may not switch the particular communication device to the dedicated transmission mode until after the communication device currently set to the dedicated transmission mode is switched to the dedicated reception mode or otherwise deactivated. In some implementations, when a first trigger for switching one of the other communication devices to the dedicated transmission mode occurs, the first trigger may also serve as a second trigger for switching the communication device currently in the dedicated transmission mode to the dedicated reception mode, which may allow one of the other communication devices to switch to the dedicated transmission mode.

PTT communication also may utilize a control channel that may carry information about each of a plurality of traffic channels. The control channel may correspond to an electromagnetic wave, such as a radio wave, of a dedicated frequency. The control channel may provide a data stream including, for example, information about one or more of the available traffic channels or about the traffic channels in aggregate. Such information may include, for example, the number of available traffic channels and the frequencies of available traffic channels. Alternatively or additionally, the data stream may include information about communication devices associated with the one or more available traffic channels including, for example, the number of communication devices connected to or waiting for each traffic channel, the types of communication devices connected to or waiting for each traffic channel, the length of time one or more communication devices have been connected to each traffic channel, whether a communication device connected to a particular traffic channel is set to the dedicated transmission mode, which communication device is currently set in a dedicated transmission mode on a particular traffic channel, the length of time a communication device has been set in a dedicated transmission mode on a particular traffic channel, the length of time a particular traffic channel has been active (e.g., an aggregate length of time that one or more communication devices have been set in a dedicated transmission mode on a particular traffic channel), which communication device is currently set in a dedicated reception mode on a particular traffic channel, whether each traffic channel is available, and other information about the communication devices connected to the traffic channels.

In implementations of PTT communication utilizing talkgroups, the control channel data stream may include information including, for example, information identifying whether a traffic channel is assigned to a talkgroup, information identifying traffic channels assigned to particular talkgroups, and other information about the traffic channels and any talkgroups to which traffic channels are assigned. Such information may allow communication devices to connect with or remain connected to talkgroups as the frequencies or traffic channels associated with the talkgroups are reallocated and as the communication devices move relative to satellites 110 (or as satellites 110 move relative to the communication devices) and the respective beams thereof, which may, for example, result in handoffs being made between beams, satellites, etc.

As described below in more detail, talkgroups may be characterized as either active talkgroups (sometimes referred to as "live" talkgroups) or inactive talkgroups (sometimes referred to as "dead" talkgroups). For example, active talkgroups may be talkgroups on which active communication is currently occurring (e.g., a user is currently speaking into a communication device connected to a talkgroup and the communication device is transmitting the spoken audio in a dedicated transmission mode) or on which active communication has occurred within a particular period of time. Similarly, inactive talkgroups may be talkgroups on which active communication is not currently occurring (e.g., no communication devices are connected to the talkgroup and transmitting in a dedicated transmission mode) or on which active communication has not occurred within a particular period of time.

In some instances, a talkgroup may be determined to be active even if active communication (e.g., speaking, data transmission) is not currently occurring (or has not occurred within the particular period of time) within the talkgroup. For example, communication devices may determine whether a talkgroup is active or inactive based on information from the control channel indicating whether one or more traffic channels are currently allocated to the talkgroup (or have been allocated to the talkgroup) within the particular period of time, rather than determining whether active communication is actually occurring (or has occurred within the particular period of time). For example, if control channel 0 provides information indicating that traffic channel 1 is currently allocated to talkgroup A or has been allocated to talkgroup A within a particular period of time (e.g., within the last 10 seconds), then a communication device 150 listening to control channel 0 may determine that talkgroup A is an active talkgroup. Alternatively, if control channel 0 provides information indicating that no traffic channels are currently allocated to talkgroup A or that no traffic channels have been allocated to talkgroup A within the particular period of time, then a communication device 150 listening to control channel 0 may determine that talkgroup A is an inactive talkgroup.

In some implementations, traffic channels may be allocated to a talkgroup in response to a request from a communication device provisioned to participate in the talkgroup. For example, if the talkgroup is inactive, no traffic channels may be currently allocated to the talkgroup. In response to a communication device that is provisioned to participate in the talkgroup requesting to participate in the dedicated transmission mode, one or more traffic channels may be allocated to the talkgroup to enable communications over the talkgroup. Thereafter, traffic channel(s) may be maintained for the talkgroup until no devices provisioned to participate in the talkgroup have participated in the talkgroup in the dedicated transmission mode for more than some defined threshold period of time. After the defined threshold period of time elapses with no device provisioned to participate in the talkgroup having participated in the talkgroup in the dedicated transmission mode, the traffic channel(s) allocated to the talkgroup may be torn down and the talkgroup may transition back to an inactive status.

In some implementations, data transmitted in the control channel may explicitly define whether a talkgroup is active or inactive. For example, in some implementations, a centralized entity (e.g., management center 130) may determine whether a talkgroup is active or inactive (e.g., based on whether active communication is occurring or has occurred within a defined period of time within the talkgroup) and transmit an indication of whether the talkgroup is active or inactive within the control channel.

A plurality of talkgroups may be available to particular communication devices or users. For example, available talkgroups for particular communication devices or users may be provisioned by management center 130, gateway 135, or a device 120 based on the communication devices' or users' affiliation with an organization. As an example, one set of available talkgroups may be provisioned for users or devices affiliated with a particular branch or division of the U.S. military, while another set of available talkgroups may be provisioned for a petroleum prospecting company, and still another set of available talkgroups may be provisioned for employees or aircraft of an airline. Each set of available talkgroups may include a plurality of talkgroups that may only be accessible (e.g., available) to devices or users associated with the organization to which the respective set of available talkgroups was provisioned. Relatedly, each device or user associated with a particular organization to which a set of available talkgroups has been provisioned only may be granted access to a subset of less than all of the available talkgroups provisioned for the particular organization. Nevertheless, in some implementations, multiple different sets of available talkgroups may utilize common beams and/or traffic channels, but utilization of the beams and/or traffic channels may be dynamically allocated such that each individual set of available talkgroups remains accessible only to devices or users associated with the organization to which the individual set of available talkgroups was provisioned. Further, in some implementations, each set of available talkgroups may be affiliated with one or more control channels that carry information about such available talkgroups. In other implementations, certain talkgroups may only be available using a particular access code, for example.

A plurality of communication devices may connect to a control channel, and the data transmitted in the control channel may enable each communication device of the plurality of communication devices (or each user thereof) to select a traffic channel to which such communication device may connect and to determine whether such communication device may be switched to the dedicated transmission mode at a particular instant in time. In some implementations, the control channel may even provide commands or assignments for particular communication devices to connect with particular traffic channels, such as when a "go to priority" or "go to favorite" feature is activated as discussed below. Further, the control channel or a similar channel may be used for establishing a connection between a first set of one or more communication devices and a second set of one or more communication devices through the Internet or another data network.

In some implementations, communication devices may continuously monitor the control channel. In other implementations, communication devices may selectively or periodically access the control channel, such as when a setting is changed or requested to be changed in the communication device (e.g., changing or requesting to change between a dedicated transmission mode and a dedicated reception mode, changing or requesting to change between talk groups), when the communication device is activated or removed from a sleep or hibernation state, or at predetermined or specified intervals of time. In some implementations, the data in the control channel may be continuously transmitted (e.g., broadcast) to the connected communication devices. In other implementations, the data in the control channel may be periodically or intermittently transmitted (e.g., broadcast) to the connected communication devices. Additionally or alternatively, the data in the control channel may be transmitted (e.g., broadcast) to the connected communication devices in response to the occurrence of or when certain events occur, such as a new communication device connecting to the control channel or when a communication device is activated or switches between the reception mode and the transmission mode, for example.

In satellite-based implementations of PTT communication systems, satellite 110 may generate one or more beams or spot beams that enable the satellite to transmit and/or receive one or more different data signals within each beam. Such beam(s) may create a footprint spanning a particular geographic region of the Earth. The footprint may be based on the characteristics of a satellite 110's antenna, such as the antenna's gain pattern, transmission power, transmit and/or receive frequencies, and the efficiency or quality of the antenna, for example. In some implementations, the radius of the particular geographic region within the footprint of a particular beam may be about 400 km. In other implementations, the radius of the particular region may be substantially less than or greater than 400 km based on factors such as the transmission power associated with the particular beam and sources of interference (e.g., mountains, trees, buildings, electromagnetic radiation sources). In some implementations, each satellite 110 may provide a plurality of beams, and each such beam may be directed to a different geographic region. Certain satellites 110 may move relative to the Earth over time, such that the geographic regions within the footprints of the satellites' 110 beams also change over time. Other satellites 110 may be geostationary, and the geographic regions within the footprints of the satellites' 110 beams may remain fixed in time or at least fixed for periods of time. Moreover, some satellites 110 may be configured to direct one or more beams to cover different geographic regions or to change power characteristics, such that the size of the geographic regions within the footprint(s) of the beam(s) may change.

Each beam may include a plurality of carriers (e.g., channels, frequencies), for example. In some implementations, frequencies may be assigned within the full spectrum of the beam, and such frequencies may be shared by communication devices within the footprint of the beam. In other implementations, frequencies may be assigned within only a portion of the full spectrum of the beam. Each beam may include one or more control channels (e.g., control channel 0) and a plurality of traffic channels (e.g., traffic channels 1, 2, 3, and 4). Accordingly, the one or more control channels and the plurality of traffic channels included in a particular beam may be available to the communication devices within the footprint of the particular beam. In some instances, however, interference sources may prevent some communication devices within the footprint of the particular beam from accessing the one or more control channels and/or the plurality of traffic channels in the particular beam.

In some implementations, beams from different satellites may create footprints that overlap with one another. In such cases, each communication device in such an overlapping region may only receive information from one control channel at a time. Consequently, the communication devices may be configured to select between the control channels associated with overlapping beams based on certain criteria. Such criteria may include, for example, one or more of the relative strength of the signal received from each beam (e.g., there may be a preference to select the control channel corresponding to the beam with a higher strength), whether the strength of the control channel currently being monitored is less than or equal to a particular signal level (e.g., there may be a preference to stay connected with the current beam until the signal strength of the beam becomes too low), and a determination of whether the communication device is currently communicating with other communication devices within the footprint of one of the beams (e.g., there may be a preference to stay connected with the current beam to maintain uninterrupted communication with the other communication devices).

Figure 2:
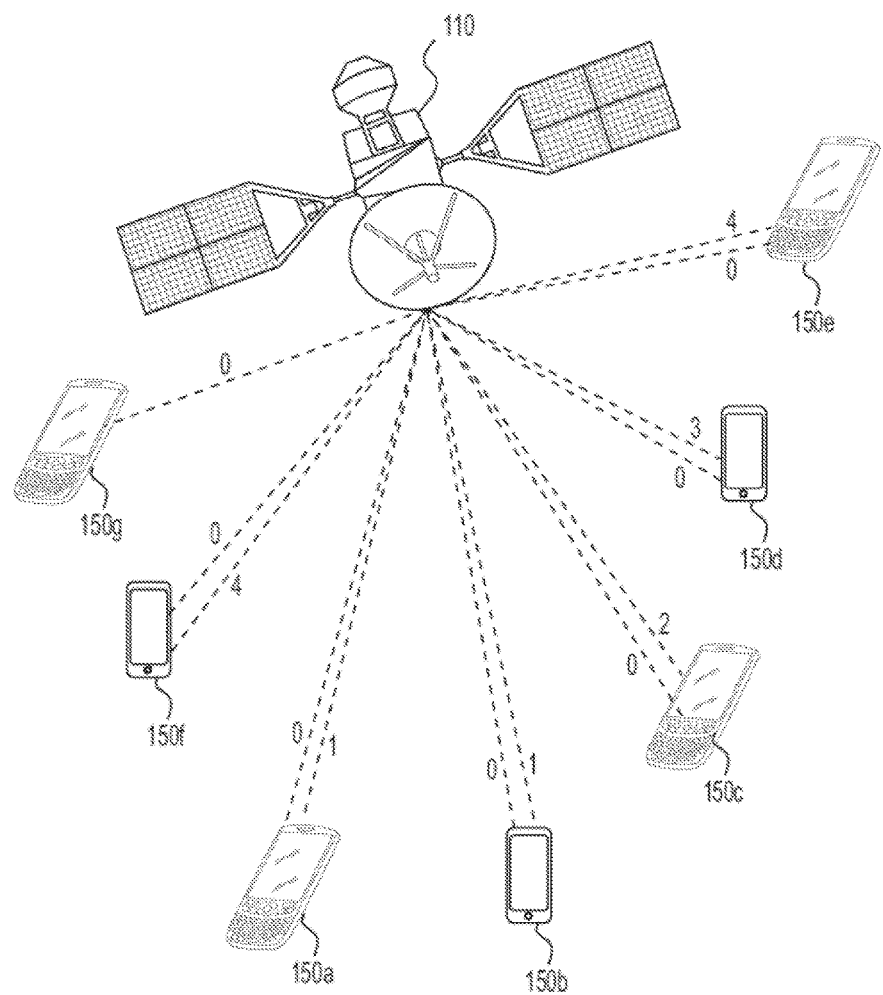
FIG. 2 is a schematic diagram illustrating a satellite-based implementation of a push-to-talk system, in accordance with particular implementations of the present disclosure.

FIG. 2 shows a schematic of one example of a satellite-based implementation of a PTT system. As shown in FIG. 2, each of communication devices 150 may monitor control channel 0. Some communication devices 150, such as communication devices 150a and 150b, may be set to transmit or receive communications via traffic channel 1. Other communication devices 150, such as communication device 150c, may be set to transmit or receive communications via traffic channel 2. Still other communication devices 150, such as communication device 150d, may be set to transmit or receive communications via traffic channel 3. Additional communication devices 150, such as communication devices 150e and 150f, may be set to transmit or receive communications via traffic channel 4. Certain communication devices 150, such as communication device 150g, may not be set to transmit or receive communications via any of traffic channels 1-4. Furthermore, the settings of communication devices 150a-g may be changed, such that one or more of communication devices 150a-g may be reset to transmit or receive communications via different ones of traffic channels 1-4 than those shown in FIG. 2.

PTT communication systems, such as network 100, may utilize a trunked radio system including a plurality of talkgroups. The trunking function may be implemented by a device 120 or by management center 130, for example. In some implementations, a talkgroup may be implemented generally using a communication channel within a trunked radio system that may function the same as or similarly to a traffic channel as described above; however, in some implementations, unlike a traffic channel assigned to a particular radio frequency, a particular talkgroup may utilize different radio frequencies at different times. A trunked radio system may include a control channel and a limited number of traffic channels. Nevertheless, systems other than trunked radio systems may also be used to implement aspects of this disclosure.

In some implementations, communication devices system may monitor the control channel to determine available traffic channels (e.g., traffic channels without current communication activity such as connected devices or active communication transmissions from devices set in a dedicated transmission mode). When a communication device is set to a particular talkgroup, the communication device may either assign an available traffic channel to the particular talkgroup or identify a traffic channel currently assigned to the particular talkgroup. Thereafter, the communication device may begin transmitting or listening on the traffic channel assigned to the talkgroup set on the communication device.

Referring to FIG. 2, communication devices 150a and 150b may both be participating in the same talkgroup, for example. Moreover, each of communication devices 150a-150g may be provisioned to participate in a plurality of talkgroups, such that communication devices 150a-150g may switch back and forth between talkgroups. For example, communication device 150a may be provisioned to participate in a talkgroup currently active on traffic channel 4 and, consequently, may switch into that talkgroup to communicate with communication devices 150e and 150f.

Figure 3:
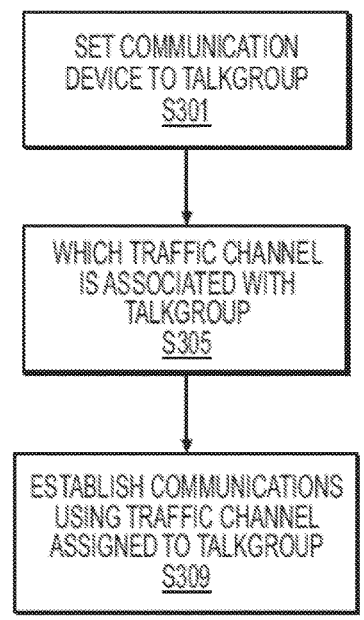
FIG. 3 is a flow chart illustrating a method for establishing communication via one or more talkgroups, in accordance with particular implementations of the present disclosure.

An example of a process of establishing communication via a talkgroup is shown in FIG. 3. In S301, a communication device may be set to a particular talkgroup, such as a talkgroup A, for example. Thereafter, in S305 the communication device may determine which traffic channel to use to connect the communication device to talkgroup A. For example, the communication device may analyze the information from a control channel, such as control channel 0, to determine if a traffic channel already has been assigned to talkgroup A (e.g., because other devices are currently connected to talkgroup A or communicating in talkgroup A). If a traffic channel already has been assigned to talkgroup A, the communication device may use the information from control channel 0 to determine which traffic channel is currently associated with talkgroup A. If a traffic channel has not already been assigned to talkgroup A, the communication device may request that a traffic channel be assigned to talkgroup A. After determining which traffic channel is associated with talkgroup A in S305, the communication device may connect to the assigned traffic channel in S309 and may begin transmitting or listening within talkgroup A.

Management center 130, gateway 135, or a device 120 may be responsible for associating a particular traffic channel with talkgroup A and transmitting this information out through control channel 0 to be received by communication devices 150, for example. Consequently, this information may be added to the control channel and the control channel may include information identifying the particular traffic channel assigned to talkgroup A. This information may be used by other communication devices when such communication devices perform S305 after being set to talkgroup A in S301.

Communication devices may disconnect from a talkgroup by switching to another talkgroup, entering a sleep or hibernation mode, or being deactivated, for example. Accordingly, once all of the devices previously connected to a particular talkgroup disconnect from the particular talkgroup or when no communication is currently being performed via the particular talkgroup (e.g., there are no devices transmitting in a dedicated transmission mode via the particular talkgroup or no devices have transmitted in a dedicated transmission mode via the particular talkgroup for a defined period of time), the traffic channel assigned to the particular talkgroup may become available for use by other talkgroups or for other communication methods. In some implementations, there may be a predetermined or selectable delay period between the time when all of the devices have disconnected from the talkgroup or the time when communication via the talkgroup has terminated and the time when the traffic channel assigned to the particular talkgroup becomes available for use by other talkgroups (e.g., 1 second, 5 seconds, 1 minute, 5 minutes). When a delay period exists, control channel 0 may also wait for the delay period before providing information that the traffic channel previously assigned to the particular talkgroup is available and that the particular talkgroup currently is not established.

In the manner described above, traffic channels may be dynamically allocated among talkgroups to efficiently reduce instances in which traffic channels are unused and to reduce the duration of such disuse. Further, certain users of network 100 may desire more secure communications. By giving these users access to particular talkgroups that frequently cycle through different traffic channels, these users may be able to communicate more securely than would otherwise be possible over a static traffic channel.

Traffic channels and control channels may support data transmission and voice transmission in certain implementations. In some implementations, talkgroups may be dynamically repurposed from voice transmission to transmission of data packets other than those carrying voice data and back to voice transmission as desired. In particular implementations, voice transmission may not be possible on a talkgroup when data transmission other than data packets for voice transmission occurs, and data transmission other than data packets for voice transmission may not be possible when voice transmission occurs.

In particular implementations, a priority talkgroup may be assigned to each communication device (e.g., communication devices 150) in a PTT communication network. In alternative implementations, a priority talkgroup may be assigned to some but not all communication devices in a PTT communication network. For example, an administrator at management center 130 may perform this function, and the communication device(s) may be provisioned with their relevant priority talkgroups over the air through network 100. In certain implementations, the priority talkgroups assigned to devices are not static and may be reassigned dynamically. In some implementations, an individual user of a communication device may not have the ability to override the assignment of a priority talkgroup and may not be able to change to another talkgroup or function when communication via the priority talkgroup is occurring.

In some implementations, the priority talkgroup may be a single talkgroup (e.g., talkgroup A) in which all communication devices associated with the priority talkgroup are provisioned to participate. In other implementations, the priority talkgroup assigned to each communication device may be different for different communication devices (e.g., talkgroup A for communication device 150a, talkgroup B for communication devices 150b and 150c, talkgroup C for communication device 150d). In such implementations, for example, certain communication devices may not be provisioned to participate in all talkgroups assigned as priority talkgroups (e.g., communication device 150a may be provisioned to participate in any of talkgroups A, B, C, and D, communication device 150b may be provisioned to participate in only talkgroups B and D, communication device 150c may be provisioned to participate in only talkgroups B and C, communication device 150d may be provisioned to participate in only talkgroups A, C, and D). In further implementations, some communication devices provisioned to participate in a PTT network may be assigned a priority talkgroup, and other communication devices provisioned to participate in the same PTT network may not be assigned a priority talkgroup.

In particular implementations, when a particular communication device begins communicating in the talkgroup that has been assigned as the priority talkgroup for one or more other communication devices, the other communication devices for which that talkgroup has been assigned as a priority talkgroup may receive information from the control channel indicating that the particular communication device is communicating in the priority talkgroup, and each such communication device may automatically switch to a listening mode (e.g., the dedicated reception mode) in the talkgroup assigned as the priority talkgroup for that communication device. For example, when talkgroup A is assigned as the priority talkgroup for a number of communication devices and a first communication device provisioned to participate in talkgroup A establishes communication over talkgroup A (e.g., requests that talkgroup A be instantiated and/or requests to enter the dedicated transmission mode for talkgroup A), all other member devices will automatically switch to talkgroup A from their current talkgroup(s) and be placed into the listening mode for the duration of communication on talkgroup A (e.g., while at least one communication device is transmitting on talkgroup A, for a predetermined time after a communication device stops transmitting on talkgroup A, until a notification that the priority communication is over has been made, until the communication device that initially switched to the priority talkgroup switches to another talkgroup). In some implementations, after communication over the priority talkgroup has ended (e.g., the talkgroup becomes inactive), each device may automatically return to the talkgroup or function to which that device was set immediately prior to automatically being switched to the priority talkgroup.

In some implementations, communication in a priority talkgroup may be established by one or more communication device transmitting a "go to priority" command. For example, a communication device may transmit a "go to priority" command to the PTT network in response to the depression of a button or other selection on the communication device. Information regarding the "go to priority" command may subsequently be pushed out over the control channel to other communication devices in the priority talkgroup. In response to receiving the information regarding the "go to priority" command, each other device in the priority talkgroup with the device that transmitted the "go to priority" command may automatically switch to the listening mode in the talkgroup assigned as the priority talkgroup for that communication device. In such implementations, each member device of the priority talkgroup may remain set to that device's priority talkgroup until receiving a "leave priority" command or some other indication that the priority communication has ended. In certain implementations, each device may automatically return to the talkgroup or function to which that device was set immediately prior to switching to the priority talkgroup in response to receiving the "leave priority" command or other indication that the priority communication has ended. In particular implementations where priority talkgroups are established based on receiving a "go to priority" command (rather than detecting that a talkgroup defined as a priority talkgroup for a device has become active and automatically switching to the priority talkgroup in response to such determination), one or more devices may remain set to the talkgroup assigned as that device's priority talkgroup after receiving the "leave priority" command or other indication that the priority communication has ended.

Particular implementations of a PTT communication system implementing a priority talkgroup feature now are disclosed in more detail with respect to FIGS. 4-6E.

Figure 4:
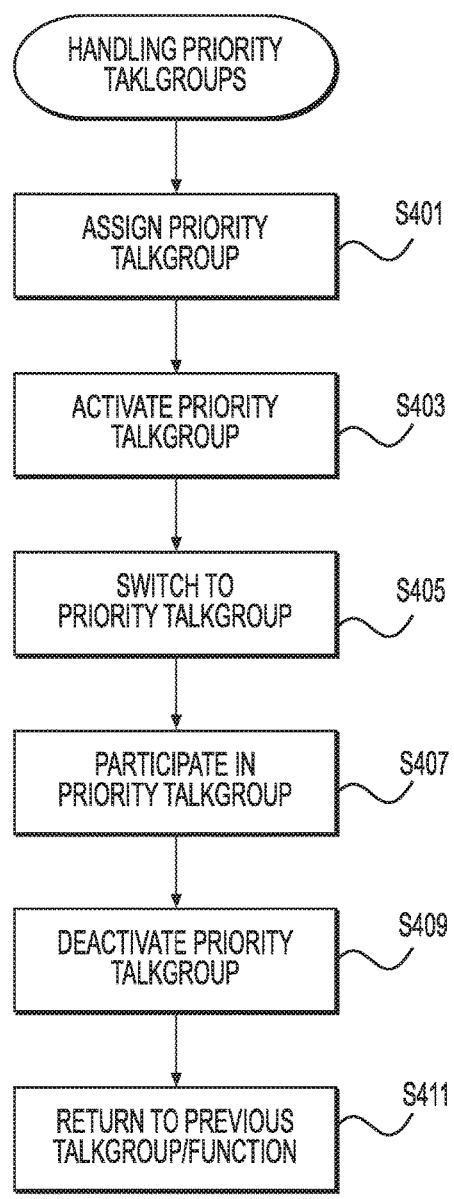
FIG. 4 is a flow chart illustrating a method of handling priority talkgroups in a push-to-talk system, in accordance with particular implementations of the present disclosure.

FIG. 4 is a flow chart illustrating a method of handling priority talkgroups in a PTT system, in accordance with particular implementations of the present disclosure.

In particular implementations, the method of handling priority talkgroups in a PTT system may be implemented within network 100, for example to ensure or increase the probability that a particular group of devices receives a particular communication. Such communications may be, for example, emergency broadcasts, warnings, transmissions of critical data or software, monitored parameters, or any other information that may be desirable to communicate to the particular group of devices simultaneously.

In S401, an administrator at an operation hub 130 (e.g., a management center) may assign one or more priority talkgroup to one or more communication devices 150 provisioned to communicate using talkgroups on network 100. As an example, the administrator may use a device 120 connected to operation hub 130 to assign priority talkgroups. During the process of assigning priority talkgroups, device 120 may select one of the talkgroups provisioned to a communication device 150 and assign that talkgroup as a priority talkgroup for the communication device 150. Likewise, device 120 may select one of the talkgroups provisioned to another communication device 150 and assign that talkgroup as the priority talkgroup for the other communication device 150. In some implementations, the same talkgroup may be assigned as the priority talkgroup for both devices. In other implementations, different talkgroups may be assigned as the priority talkgroup for each device. Device 120 may repeat this process for a plurality of communication devices 150, such that a plurality of communication devices 150 are assigned to priority talkgroups. Satellites 110 may transmit information specifying the priority talkgroup assignments to communication devices 150 via one or more control or other channels, and the communication devices 150 may store information about their priority talkgroup assignments locally (e.g., in memory or some other form of physical storage media).

In some implementations, device 120 may also select other talkgroups provisioned to the communication device 150 and assign those talkgroups as other priority talkgroups for the communication device 150, such that a plurality of priority talkgroups are assigned to communication device 150. Each of the plurality of priority talkgroups assigned to communication device 150 may have a different priority level, such that the plurality of priority talkgroups may be ordered from highest priority to lowest priority. To facilitate the explanation of the method of handling priority talkgroups, however, only one priority talkgroup is referred to in the remaining description of FIG. 4.

In S403, the priority talkgroup may be activated. In some implementations, the priority talkgroup may be activated by issuing a "go to priority" command from one of the communication devices 150 for which the talkgroup has been assigned as a priority talkgroup. In other implementations, the priority talkgroup may be activated by one of the communication devices 150 for which the talkgroup has been assigned as the priority talkgroup 150 switching to the priority (e.g., requesting that the priority talkgroup be instantiated or requesting to enter the dedicated transmission mode in the priority talkgroup) or in response to the communication device 150 transmitting over the talkgroup assigned as the priority talkgroup for that communication device 150. In still other implementations, a communication device 150 may perform other actions to signal activation of the priority talkgroup. Specifically, when the communication device 150 performs some action indicating that the priority talkgroup is active, this information may be transmitted by the control channel such that communication devices 150 provisioned to participate in the priority talkgroup and/or communication devices 150 for which the priority talkgroup has been assigned as the priority talkgroup are aware of the activity related to the priority talkgroup.

In S405, other communication devices 150 for which the talkgroup has been assigned as the priority talkgroup may receive from the control channel the information indicating that the priority talkgroup is active. In response to receiving this information, each of these communication devices 150 may immediately switch from its current function and/or talkgroup to the dedicated reception mode for the talkgroup assigned as the priority talkgroup for that device. This switch may be mandatory in particular implementations. For example, a user of a communication device 150 may not be able to override the switch. Consequently, all active communication devices 150 for which the talkgroup has been assigned as the priority talkgroup (except for the communication device 150 that has the floor in the talkgroup) may be placed in a state ready to receive communications over the priority talkgroup in such implementations. In some implementations, however, certain communication devices 150 that may already be participating in a higher priority talkgroup may not switch to the newly-activated priority talkgroup, for example.

In S407, a communication device 150 may take the floor (e.g., transmit in the dedicated transmission mode) of the priority talkgroup such that communications transmitted by the communication device 150 with the floor are received by one or more satellites 110 and then broadcast by one or more satellites 110 to all communication devices 150 in the dedicated reception mode for the priority talkgroup. This information may be voice communication or data communication in particular implementations. Thus, the communication devices 150 assigned to the priority talkgroup may participate in the priority talkgroup by either receiving information broadcast over the priority talkgroup or transmitting information over the priority talkgroup.

In certain implementations, the communication device 150 that initially takes the floor in the priority talkgroup may be the communication device that initially activated the priority talkgroup. In some implementations, the communication device 150 that takes the floor may merely be a device that has switched to the dedicated transmission mode while participating in the priority talkgroup.

In S409, the control channel may provide information indicating that the priority talkgroup is inactive to the communication devices 150 assigned to the priority talkgroup. For example, the control channel may provide information indicating that active communication is not currently occurring in the priority talkgroup (e.g., no communication devices are transmitting in a dedicated transmission mode on the priority talkgroup) or that active communication has not occurred in the priority talkgroup within a particular period of time. Additionally or alternatively, the control channel may provide other information that similarly indicates that the priority talkgroup is inactive, such as information indicating that a communication device 150 transmitted a "leave priority" command, for example. This information provided by the control channel may function as a command to deactivate the priority talkgroup and/or the communication devices may determine to deactivate or switch out of the priority talkgroup in response to receiving such information via the control channel.

In S411, after receiving the information indicating that the priority talkgroup is inactive from the control channel, individual communication devices 150 for which the talkgroup is assigned as the priority talkgroup and that automatically switched over to the talkgroup may leave the priority talkgroup and switch to the talkgroup and/or function previously being used by the communication device 150 when the communication device 150 switched to the priority talkgroup.

Thereafter, the method of handling priority talkgroups may end until priority talkgroups are reassigned or the priority talkgroup is activated again, for example.

In particular implementations, more than one priority talkgroup may be assigned for each communication device, such that each assigned priority talkgroup has a relative priority in relation to the other priority talkgroups assigned to the device. In certain implementations, anywhere between 0 and 15 priority talkgroups may be assigned for any individual communication device. FIG. 5 is a table showing an example implementation of the present disclosure in which a plurality of communication devices are provisioned to participate in a plurality of talkgroups and are assigned to a plurality of priority talkgroups. Based on assignments made by an administrator (e.g., via device 120), satellites 110 may transmit information specifying the relative priority of priority talkgroups to communication devices 150 via one or more control or other channels.

For example, FIG. 5 shows an implementation in which communication devices 150*a-g* may be provisioned to participate in one or more of talkgroups A-J and may be assigned one or more of priority talkgroups 1-4. The PTT administrator may set priority talkgroup 1 as the highest priority talkgroup and assign talkgroup C as priority talkgroup 1 for each of communication devices 150*a-g*. Further, the PTT administrator may set priority talkgroup 2 as the second highest priority talkgroup and assign talkgroup H as priority talkgroup 2 for each of communication devices 150*a-c*. Communication devices 150*d-g* may not be assigned priority talkgroup 2 as a second level priority talkgroup, for example. In addition, the PTT administrator may set priority talkgroup 3 as the third highest priority talkgroup and assign talkgroup B as priority talkgroup 3 for each of communication devices 150*a,d,e*. Communication devices 150*b,c,f,g* may not be assigned to priority talkgroup 3 as a third level priority talkgroup, for example. The PTT administrator also may set priority talkgroup 4 as the fourth highest priority talkgroup and assign talkgroup E as priority talkgroup 4 for each of communication devices 150*e-g*. Communication devices 150*a-d* may not be assigned to priority talkgroup 4 as a fourth level priority talkgroup, for example. In the example of FIG. 5, the talkgroups that individual communication devices have been provisioned to participate within but that have not been assigned as priority talkgroups for the device may be referred to as non-priority talkgroups and may function as typical PTT talkgroups.

In some implementations, an individual one of communication devices 150*a-g* may be assigned its own priority talkgroup hierarchy that is different and independent from the priority talkgroup hierarchy of other ones of communication devices 150*a-g*. For example, communication device 150*a* may be assigned a three-level priority talkgroup hierarchy in which talkgroup C is communication device 150*a*'s highest level priority talkgroup followed by talkgroup H and talkgroup B. Meanwhile, communication device 150*b* may be assigned a four-level priority talkgroup hierarchy in which talkgroup A is communication device 150*b*'s highest level priority talkgroup followed by talkgroup B, talkgroup C, and talkgroup J.

FIGS. 6A-6E show examples of communication between communication devices 150*a-g* when communication devices 150*a-g* are set to various ones of talkgroups A-J in accordance with the talkgroup provisioning and priority talkgroup assignments shown in the example implementation of FIG. 5.

Figure 6A:
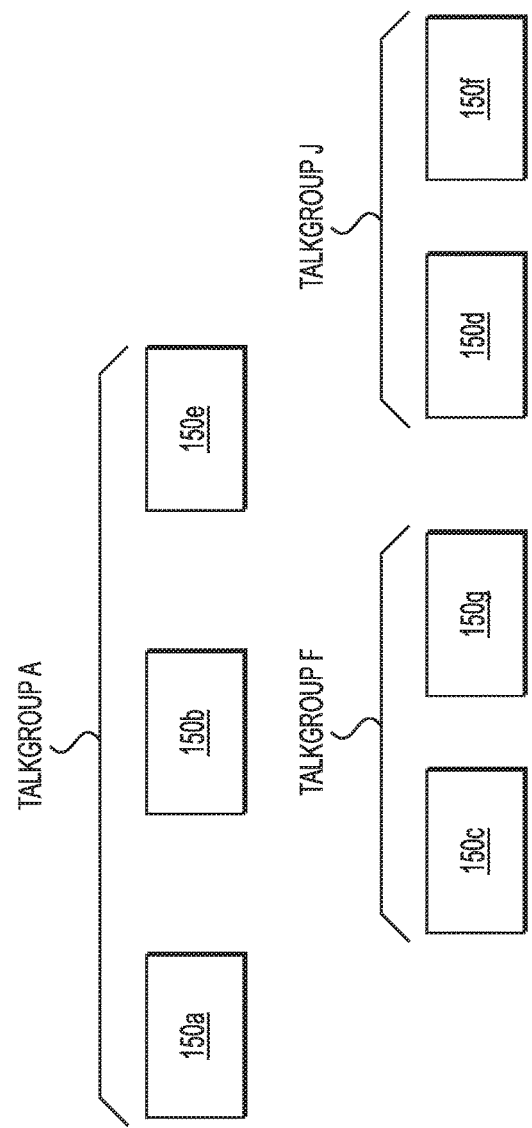
FIG. 6A shows a plurality of communication devices participating in a plurality of non-priority talkgroups.

FIG. 6A shows a plurality of communication devices participating in a plurality of non-priority talkgroups. In FIG. 6A, communication devices 150*a,b,e* may be participating in talkgroup A, communication devices 150*c,g* may be participating in talkgroup F, and communication devices 150*d,f* may be participating in talkgroup J.

Figure 6B:
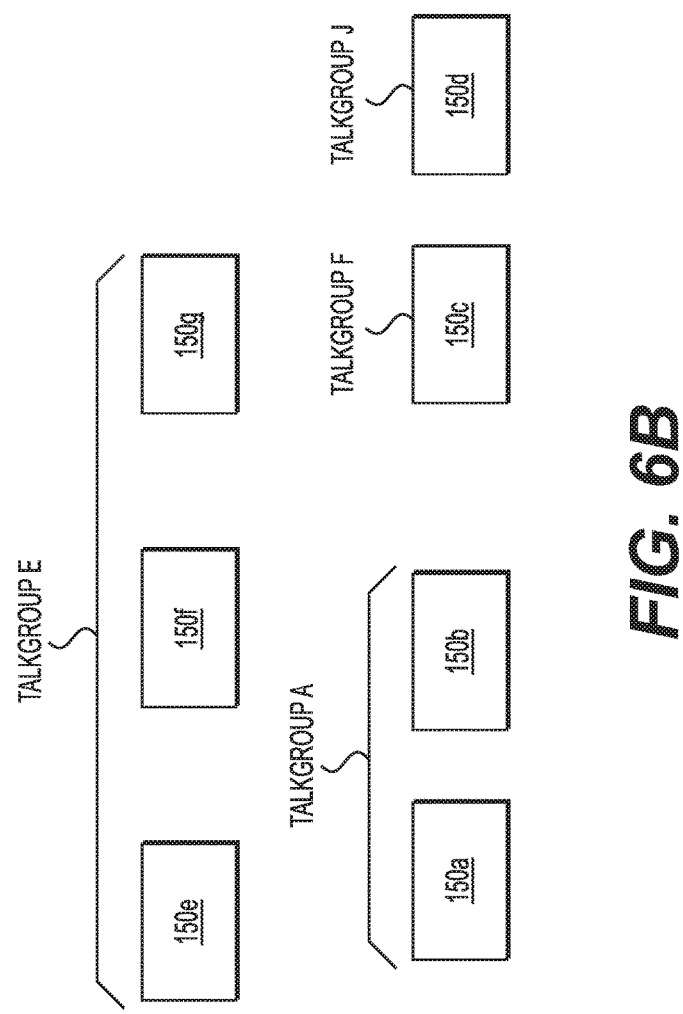
FIG. 6B shows a result of a transition by the communication devices from the talkgroups shown in FIG. 6A to a fourth highest priority talkgroup of FIG. 5.

FIG. 6B shows a result of a transition by the communication devices from the non-priority talkgroups shown in FIG. 6A to a fourth highest priority talkgroup. In FIG. 6B, communication device 150g, for example, may switch to talkgroup E. Because talkgroup E is assigned as priority talkgroup 4, communication devices 150e,f automatically switch from their current talkgroup (e.g., talkgroups A and J, respectively) to talkgroup E, which is also assigned as priority talkgroup 4 for communication devices 150e,f, and communication devices 150e-g begin participating in talkgroup E. Communication devices 150a,b may remain participants in talkgroup A, communication device 150c may remain a participant in talkgroup F, and communication device 150d may remain a participant in talkgroup J. Although not shown in FIG. 6B, because each of communication devices 150a-d are provisioned to participate in talkgroup E, one or more of communication devices 150a-d may also be switched by the device user to talkgroup E and begin participating in talkgroup E with communication devices 150e-g. Nevertheless, unlike communication devices 150e,f, such a switch to talkgroup E by communication devices 150a-d may not be automatic.

Although communication device 150g was described as the initial communication device to switch to talkgroup E in the example above, one of communication devices 150e,f could alternatively have been the initial communication device to switch to talkgroup E. In this case, the other of communication devices 150e,f and communication device 150g would automatically switch from their current talkgroup (e.g., talkgroups A or J and F, respectively) to talkgroup E, and similarly begin participating in talkgroup E.

In some implementations, once talkgroup E has been instantiated, the users of one or more of communication devices 150e-g may not switch their respective device(s) to a non-priority talkgroup. For example, the user of communication device 150f may not be permitted to switch the current talkgroup of communication device 150f to talkgroup B or J, and the user of communication device 150e may not be permitted to switch the current talkgroup of communication device 150e to talkgroup A, D, F, G, H, I, or J. In some implementations, for example, the user of communication device 150g may switch the current talkgroup to a non-priority talkgroup (e.g., talkgroup F) since communication device 150g initiated communication over talkgroup E. In such implementations, switching the current talkgroup of communication device 150g from talkgroup E to a non-priority talkgroup (e.g., talkgroup F) may serve as a trigger for communication devices 150e,f to respectively switch back to talkgroups A and J or otherwise permit communication devices 150e,f to freely switch between talkgroups. In some implementations, the user of the communication device that initiated talkgroup E (e.g., communication device 150g in this example) may not be permitted to switch the communication device to a non-priority talkgroup until talkgroup E itself has become inactive.

In other implementations, for example, an alternative event (e.g., no transmission on talkgroup E has occurred for a predetermined period of time, talkgroup E has been active for at least a predetermined period of time, a "leave priority" command has been received, the device that initiated talkgroup E is turned off or deactivated, no communication device is currently transmitting in talkgroup E) may serve as a trigger for communication devices 150e-g to respectively switch back to talkgroups A, J, and F.

In certain implementations, even after having been switched to talkgroup E because of its assignment as priority talkgroup 4, one or more of communication devices 150e-g may be permitted to switch to a different talkgroup if that talkgroup is a higher priority talkgroup. For example, in such implementations, the user of communication device 150e may switch the current talkgroup of communication device 150e from talkgroup E to talkgroup B or talkgroup C, even when communication device 150e is participating in talkgroup E with communication devices 150f,g. Subsequently, communication devices 150f,g may remain in talkgroup E if communication devices 150f,g are not assigned to the higher priority talkgroup. In other implementations, users of one or more of communication devices 150e-g may not be permitted to switch the talkgroup of the communication device from talkgroup E when they have been switched into it because of its assignment as priority talkgroup 4 and only may switch to a higher priority talkgroup when it is instantiated by another device.

Figure 6C:
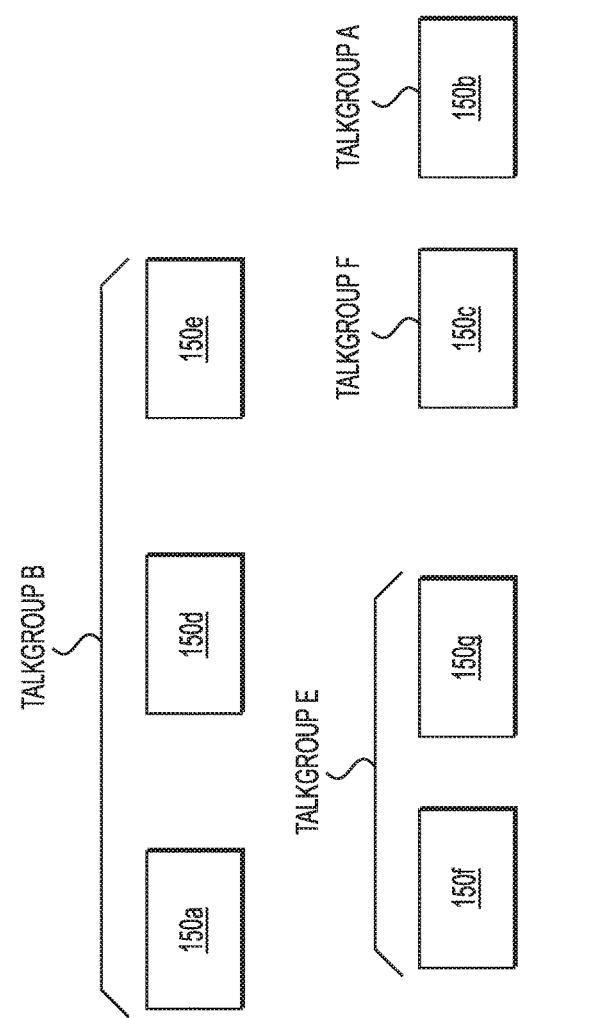
FIG. 6C shows a result of a transition by the communication devices from the talkgroups shown in FIG. 6B to a third highest priority talkgroup of FIG. 5.

FIG. 6C shows a result of a transition by the communication devices from the talkgroups shown in FIG. 6B to a third highest priority talkgroup. In FIG. 6C, communication device 150d, for example, may switch to talkgroup B. Because talkgroup B is assigned as priority talkgroup 3, communication devices 150a,e automatically switch from their current talkgroup (e.g., talkgroups A and E, respectively) to talkgroup B, which is also assigned as priority talkgroup 3 for communication devices 150a,e, and communication devices 150a,d,e begin participating in talkgroup B. In other words, because talkgroup B has a higher priority than talkgroup E for communication device 150e, communication device 150e will switch from talkgroup E to talkgroup B. Nevertheless, communication devices 150f,g will remain participants in talkgroup E, for example, until priority communication in talkgroup E ends. Further, communication devices 150b,c may remain in talkgroups A and F, respectively. Although not shown in FIG. 6C, because communication device 150b is provisioned to participate in talkgroup B, communication device 150b may also be switched by the device user to talkgroup B and begin participating in talkgroup B with communication devices 150a,d,e. Nevertheless, unlike communication devices 150a,e, such a switch to talkgroup B by communication device 150b may not be automatic.

Although communication device 150d was described as the initial communication device to switch to talkgroup B in the example above, communication device 150a, or communication device 150e in some implementations, could alternatively have been the initial communication device to switch to talkgroup B. In this case, the other of communication devices 150a,e and communication device 150d would automatically switch from their current talkgroup (e.g., talkgroups A or E and J, respectively) to talkgroup B and similarly begin participating in talkgroup B.

In some implementations, once priority talkgroup B is instantiated, the users of one or more of communication devices 150a,d,e may not switch their respective device(s) to a non-priority or lower-priority talkgroup. For example, the user of communication device 150a may not be permitted to switch the current talkgroup of communication device 150a to talkgroup A, D, E, F, G, I, or J, and the user of communication device 150e may not be permitted to switch the current talkgroup of communication device 150e to talkgroup A, D, E, F, G, H, I, or J. In some implementations, however, the user of communication device 150d may be permitted to switch the current talkgroup to a non-priority talkgroup (e.g., talkgroup A, E, H, or J) since communication device 150d initiated communication over priority talkgroup B. Likewise, this may serve as a trigger for communication device 150a to switch back to talkgroup A and permit communication device 150a to freely switch between talkgroups. If priority talkgroup E remains active, switching communication device 150d to a non-priority talkgroup may serve as a trigger for communication device 150*e* to switch back to talkgroup E, but communication device 150*e* may not be permitted to switch freely among talkgroups until priority talkgroup E becomes inactive, for example due to talkgroup E's status as priority talkgroup 4. If talkgroup E is no longer active, switching communication device 150*d* to a non-priority talkgroup may serve as a trigger for communication device 150*e* to switch back to talkgroup A and permit communication device 150*e* to freely switch between talkgroups.

In some implementations, even after having switched to talkgroup B because of its assignment as priority talkgroup 3, users of one or more of communication devices 150*a,d,e* may be permitted to switch to a higher priority talkgroup. For example, the user of communication device 150*a* may switch the current talkgroup of communication device 150*a* from talkgroup B to talkgroup H or C. Subsequently, communication devices 150*d,e* may remain in talkgroup B if neither talkgroup H or C is assigned as a higher priority talkgroup for communication devices 150*d,e*. In other implementations, users of one or more of communication devices 150*a,d,e* may not be permitted to switch the talkgroup of the communication device from talkgroup B when they have been switched into it because of its assignment as priority talkgroup 3 and only may switch to a higher priority talkgroup when it is instantiated by another device.

FIG. 6D shows a result of a transition by the communication devices from the talkgroups shown in FIG. 6C to a second highest priority talkgroup. In FIG. 6D, communication device 150*b*, for example, may switch to talkgroup H. Because talkgroup H is assigned as priority talkgroup 2 for communication devices 150*a,c*, communication devices 150*a,c* automatically switch from their current talkgroup (e.g., talkgroups B and F, respectively) to talkgroup H and begin participating in talkgroup H. In other words, because priority talkgroup 2 has a higher priority than priority talkgroup 3, communication device 150*a* will switch from talkgroup B to talkgroup H. Nevertheless, communication devices 150*d,e* may remain participants in talkgroup E, for example until priority talkgroup 3 becomes inactive. Likewise, communication devices 150*f,g* may remain participants in talkgroup E until talkgroup 4 becomes inactive.

Although communication device 150*b* was described as the initial communication device to switch to talkgroup H in the example above, communication device 150*c* or communication device 150*a* in some implementations, could alternatively have been the initial communication device to switch to talkgroup H. In this case, the other of communication devices 150*a,c* and communication device 150*b* would automatically switch from their current talkgroup (e.g., talkgroups B or F and A, respectively) to talkgroup H and begin participating in talkgroup H.

In some implementations, once talkgroup H is instantiated, the users of one or more of communication devices 150*a-c* may not switch their respective device(s) to a non-priority or lower-priority talkgroup. For example, the user of communication device 150*a* may not be permitted to switch the current talkgroup of communication device 150*a* to talkgroup A, B, D, E, F, G, I, or J, and the user of communication device 150*c* may not be permitted to switch the current talkgroup of communication device 150*c* to talkgroup D, E, F, G, I, or J. In some implementations, however, the user of communication device 150*b* may switch from talkgroup H to a non-priority talkgroup (e.g., talkgroup A, B, D, E, F, or G) since communication device 150*b* initiated communication over talkgroup H. Likewise, this may serve as a trigger for communication device 150*c* to switch back to talkgroup F and permit communication device 150*c* to freely switch between talkgroups. If talkgroup H remains active, switching communication device 150*b* to a non-priority talkgroup may serve as a trigger for communication device 150*a* to switch back to talkgroup B because of its assignment as priority talkgroup 3 for communication device 150, but communication device 150*a* may not be permitted to switch freely among talkgroups until talkgroup B becomes inactive. If talkgroup B is no longer active, switching communication device 150*b* to a non-priority talkgroup may serve as a trigger for communication device 150*a* to switch back to talkgroup A and permit communication device 150*a* to freely switch between talkgroups.

Like the implementations described above with respect to FIG. 6C, users of one or more of communication devices 150*a-c* may be permitted to switch from talkgroup H to a higher priority talkgroup. For example, the users of communication devices 150*a-c* may switch the current talkgroup of communication devices 150*a-c* from talkgroup H to talkgroup C, even when communication devices 150*a-c* are participating in talkgroup H.

Figure 6E:
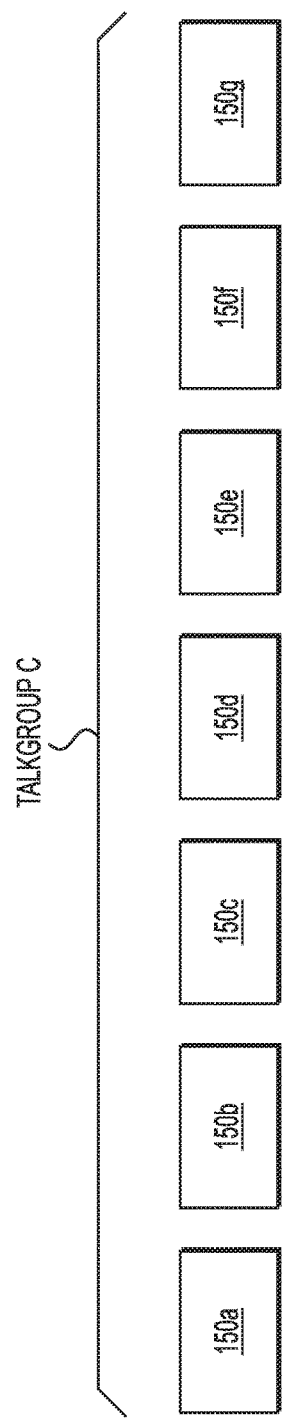
FIG. 6E shows a result of a transition by the communication devices from the talkgroups shown in FIG. 6D to a highest priority talkgroup of FIG. 5, each in accordance with particular implementations of the present disclosure.

FIG. 6E shows a result of a transition by the communication devices from the talkgroups shown in FIG. 6D to a highest priority talkgroup. In FIG. 6E, one of communication devices 150*a-g*, for example, may switch to talkgroup C. Because talkgroup C is assigned as priority talkgroup 1 for communication devices 150*a-g*, the others of communication devices 150*a-g* automatically switch from their current talkgroup (e.g., talkgroups B, E, and H) to talkgroup C and begin participating in talkgroup C. In other words, because priority talkgroup 1 has a higher priority than priority talkgroups 2-4, communication devices 150*a-c* will switch from talkgroup H to talkgroup C, communication devices 150*d,e* will switch from talkgroup B to talkgroup C, and communication devices 150*f,g* will switch from talkgroup E to talkgroup C.

In some implementations, once talkgroup C is instantiated, the users of one or more of communication devices 150*a-g* may not be permitted to switch their respective devices to a non-priority or lower-priority talkgroup. In some implementations, however, the user of the one of communication devices 150*a-g* that initiated communication over talkgroup C may be permitted to switch the current talkgroup to lower-priority talkgroup (e.g., talkgroups B, E, H), or even a non-priority talkgroup (e.g., talkgroups A, B, and D-J, depending on which communication device is being operated) in certain implementations. Likewise, this may serve as a trigger for the others of communication devices 150*a-g* to switch back to an active, lower-priority talkgroup (if such priority talkgroup is still active or has become activated since) or to a non-priority talkgroup.

In the example implementations shown in FIGS. 6A-6E, communication devices may determine whether their priority talkgroups are active based on information received from the control channel.

As described above, talkgroups may be used to transmit voice communications or data communication. In some implementations, talkgroups may function as a mechanism for transmitting packets of information. In some implementations, the packets of information may include sound data that may be used to implement voice communication. In other implementations, the packets of information may include data representing other media, such as text, software, videos, and webpages, for example. In still other implementations, some talkgroups may carry packets of information including sound data, and other talkgroups may carry packets of information including data representing other media, or talkgroups may be dynamically reallocated to carry these different types of data packets as needed. In some implementations, the PTT administrator may dynamically reallocate talkgroups between voice communication and data communication at the management center. In other implementations, users of communication devices may dynamically reallocate talkgroups between voice communication and data communication at the communication devices themselves.

For example, a particular talkgroup may be responsible for transmitting critical software patches to communication devices in a PTT network. In certain implementations, this talkgroup may be assigned as a priority talkgroup, such that a network administrator can ensure or increase the likelihood that all devices managed by the administrator will receive the patch, and that all such devices will receive the patch at approximately the same time. Such an implementation may facilitate network management and improve network efficiency and security by reducing the number of unpatched communication devices in the PTT network, for example.

Another example implementation of the priority talkgroup feature may include an oil pipeline that needs to get parameter updates across large sections of the pipeline. Different monitoring devices and valves may be spread along the pipeline (e.g., 50 miles apart), and each of the monitoring devices and valves may need a firmware update or may need information about another valve in the pipeline. Similar to the implementation described above, a priority talkgroup may be established for pushing out the firmware update to all of the valves and monitoring devices. In this manner, the monitoring devices and valves along the entire pipeline may be switched to the priority talkgroup at once, and the firmware for all of the valves and the monitoring devices may be simultaneously updated, such that all of the valves and monitoring devices have the same firmware version at the same time. Similarly, a priority talkgroup may be established for transmitting or requesting monitored parameters (e.g., pressure, temperature) to/from monitoring devices and/or valves. For example, one monitoring device may activate a priority talkgroup assigned to all other monitoring devices and send a request for monitored parameters simultaneously to all monitoring devices. This may be more efficient and use fewer resources than individually contacting all of the other monitoring devices and requesting their monitored parameters, for example. Similarly, if a valve malfunctions, the associated monitoring device may activate the priority talkgroup and send a notification of the malfunction to other valves simultaneously, such that the other valves can take appropriate actions to prevent the malfunction from cascading.

Another example implementation of priority talkgroups may involve a large number (e.g., hundreds) of aircraft over a large area. Each aircraft may include a communication device assigned to a priority talkgroup, and each aircraft may use the priority talkgroup to effectively broadcast its position to all of the other aircraft at given intervals of time. For example, all of the devices in the priority talkgroup may receive this information in a manner similar to a broadcast, such that all of the aircraft are constantly receiving updated position information related to the other aircraft.

FIG. 7A shows a schematic diagram of a mobile communication device configured to participate in a satellite communication system, including, for example, a satellite-based PTT system, in accordance with particular implementations of the present disclosure. Communication device 150 may include a central processing unit ("CPU") 701A, a memory 702A, and an input/output ("I/O") device 703A.

Memory 702A may store computer-readable instructions that may instruct CPU 701A to perform certain processes. Memory 702A may comprise, for example, RAM, ROM, EPROM, Flash memory, a hard disk drive, a solid state drive, or any suitable combination thereof. When executed by CPU 701A, the computer-readable instructions stored in memory 702A may instruct CPU 701A to operate as one or more devices configured to perform particular functions. In certain implementations, memory 702A may store computer-readable instructions for performing any and all functions or processes described herein, and CPU 701A may execute such computer-readable instructions and operate as one or more devices configured to perform or control such functions or processes. Memory 702A may store data, such as position information, information about provisioned talkgroups, or connection information associated with network 100, for example.

CPU 701A may execute the computer-readable instructions stored in memory 702A, and the computer-readable instructions may instruct CPU 701A to perform or control a plurality of processes including, but not limited to, one or more of the processes described with respect to FIGS. 3-5 and 6A-6E and any other process described herein. Accordingly, CPU 701A may be configured to perform a variety of processes, as discussed above in more detail. For example, CPU 701A may be a processor, a controller, an application specific integrated circuit ("ASIC"), or a system comprising a plurality of processors, controllers, or ASICs.

I/O device 703A may receive one or more of data from network 100, data from one or more other devices connected to communication device 150, and input from a user and provide such information to CPU 701A and/or memory 702A. I/O device 703A may transmit data to network 100, may transmit data to one or more other devices connected to communication device 150, and may transmit information to a user (e.g., display the information or indicators thereof, provide audible indications of such information). I/O device 703A may include, for example, one or more of a transceiver, a modem, a network card, a transmitter, a receiver, a microphone, a speaker, an antenna, a light-emitting diode ("LED"), a display device, or any other device configured to provide or receive information.

FIG. 7B shows a schematic illustration of a device 120 configured to implement one or processes for managing communication in a satellite communication system, including, for example, a satellite-based PTT system, in accordance with particular implementations of the present disclosure. Device 120 may include a CPU 701B, a memory 702B, and an I/O device 703B. In some implementations, CPU 701B, a memory 702B, and an I/O device 703B may function similarly to CPU 701A, a memory 702A, and an I/O device 703A. In other implementations, CPU 701B, a memory 702B, and an I/O device 703B may have functionalities different from CPU 701A, a memory 702A, and an I/O device 703A.

Memory 702B may store computer-readable instructions that may instruct CPU 701B to perform certain processes. Memory 702B may comprise, for example, RAM, ROM, EPROM, Flash memory, a hard disk drive, a solid state drive, or any suitable combination thereof. When executed by CPU 701B, the computer-readable instructions stored in memory 702B may instruct CPU 701B to operate as one or more devices configured to perform particular functions. In certain implementations, memory 702B may store computer-readable instructions for performing any and all functions or processes described herein, and CPU 701B may execute such computer-readable instructions and operate as one or more devices configured to perform or control such functions or processes. Memory 702B may store data, such as position information, information about provisioned talkgroups, information about communication devices 150, or operational information associated with network 100, for example.

CPU 701B may execute the computer-readable instructions stored in memory 702B, and the computer-readable instructions may instruct CPU 701B to perform or control a plurality of processes including, but not limited to, one or more of the processes described with respect to FIGS. 3-5 and 6A-6E and any other process described herein. Accordingly, CPU 701B may be configured to perform a variety of processes, as discussed above in more detail. For example, CPU 701B may be a processor, a controller, an ASIC, or a system comprising a plurality of processors, controllers, or ASICs.

I/O device 703B may receive one or more of data from network 100, data from one or more other devices connected to communication device 120, and input from a user and provide such information to CPU 701B and/or memory 702B. I/O device 703B may transmit data to network 100, may transmit data to one or more other devices connected to communication device 120, and may transmit information to a user (e.g., display the information or indicators thereof, provide audible indications of such information). I/O device 703B may include, for example, one or more of a transceiver, a modem, a network card, a transmitter, a receiver, a microphone, a speaker, an antenna, a LED, a display device, or any other device configured to provide or receive information.

The flowcharts and diagrams in FIGS. 1-5 and 6A-6E illustrate examples of the architecture, functionality, and operation of possible implementations of systems, methods and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to include the plural forms as well, unless the context clearly indicates otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. Moreover, as used herein, the term "user" is intended to refer to one or more of a person, an organization, a computer, or any other entity, apparatus, device, or system.

For example, the terms "communication device," "communication system," "device," and "system" may generally refer to and include satellites 110, satellite links 115, operation hubs 130, devices or systems connected with clouds 140, devices 120, gateways 135, communication devices 150, or any other devices or systems that facilitate the communication of information. Moreover, the terms "management center," "management device," and "management system" may generally refer to and include satellites 110, satellite links 115, management center 130, devices or systems connected with clouds 140, devices 120, gateways 135, communication devices 150, or any other devices or systems that facilitate managing the communication of information. In addition, the term "satellite constellation" may refer to a single satellite or to a plurality of satellites.

While the techniques and implementations disclosed herein have generally been described in the context of satellite-based PTT communication, such techniques and implementations may readily be applied to other communication systems. For example, the techniques and implementations disclosed herein may be applied to cellular-based PTT communication systems, other terrestrial-based PTT communication systems, land mobile radio ("LMR") communication systems, hybrid communication systems using one or more of the communication systems described herein or apparent to one of skill in the art, or any other communication systems conceivable by one of skill in the art.

Aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in combinations of software and hardware that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of such a computer-readable storage medium include the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to satellite communications, wireless, wireline, optical fiber cable, RF signals, etc., or any suitable combination of the foregoing.

Computer program code for carrying out operations for aspects of the present disclosure may be written in any combination of one or more programming languages, including an object oriented programming language, such as JAVA, C++, C#, or other suitable programming languages. The program code may execute entirely on a user's device, partly on a user's device, as a stand-alone software package, partly on a user's device and partly on a remote computer, or entirely on a remote computer or server. In the latter scenario, a remote computer may be connected to a user's device through any type of network, including a satellite communications network, a local area network ("LAN"), or a wide area network ("WAN"), or the connection may be made to an external computer (for example, through the Internet using an Internet Service Provider) or offered as a service, such as, for example, a Software as a Service ("SaaS"), e.g., over a secure web interface via a https connection.

Aspects of the present disclosure are described herein with reference to flowchart illustrations and/or block diagrams of methods, apparatuses (including systems), and computer program products. Individual blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer-readable medium. When accessed from the computer-readable medium and executed, the computer program instructions may direct a computer, other programmable data processing apparatus, or other devices to function in a particular manner, such that the instructions when stored in the computer-readable medium produce an article of manufacture including instructions that, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to explain the principles of the disclosure and the practical application, and to enable others of ordinary skill in the art to understand the disclosure with various modifications as are suited to the particular use contemplated.

What is claimed is:

1. A system comprising:
   a communications network comprising one or more nodes for transmitting wireless communications to and receiving wireless communications from wireless communications devices; and
   a talkgroup management system configured to:
      support multiple talkgroups, individual talkgroups enabling wireless communications devices designated as being members of corresponding ones of the individual talkgroups to exchange group communications with each other across the communications network;
      store, in computer-accessible storage, information designating a set of talkgroups as talkgroups of which a particular communications device is a member and identifying a particular talkgroup within the set as being a priority talkgroup for the particular communications device;
      process a request to instantiate the particular talkgroup; and
      cause, as a consequence of processing the request to instantiate the particular talkgroup and based on the stored information identifying the particular talkgroup within the set as being the priority talkgroup for the particular communications device, at least one node to transmit a communication for the particular communications device announcing the instantiation of the particular talkgroup.

2. The system of claim 1 wherein:
   the communications network comprises a satellite communications network; and
   the one or more nodes for transmitting wireless communications to and receiving wireless communications from wireless communications devices include a satellite for transmitting wireless communications to and receiving wireless communications from wireless communications devices.

3. The system of claim 2 wherein the one or more nodes for transmitting wireless communications to and receiving wireless communications from wireless communications devices include multiple satellites for transmitting wireless communications to and receiving wireless communications from wireless communications devices, wherein intersatellite communication links enable individual ones of the satellites to exchange communications with other individual ones of the satellites.

4. The system of claim 1 wherein the communications network is a terrestrial communications network.

5. The system of claim 1 wherein the communications network is a cellular communications network.

6. The system of claim 1 wherein the communications network is a land mobile radio network.

7. The system of claim 1 wherein the talkgroup management system is further configured to instantiate the particular talkgroup as a consequence of processing the request to instantiate the particular talkgroup.

8. The system of claim 7 wherein the talkgroup management system is further configured to instantiate the particular talkgroup by causing one or more nodes of the communications network to establish one or more corresponding channels between the one or more nodes and wireless communications devices designated as being members of the particular talkgroup, the one or more corresponding channels enabling the wireless communications devices designated as being members of the particular talkgroup to exchange group communications with each other across the communications network.

9. The system of claim 1 wherein the talkgroup management system configured to cause the at least one node to transmit a communication for the particular communications device announcing the instantiation of the particular talkgroup comprises a talkgroup management system configured to cause the at least one node to transmit a communication for the particular communications device announcing the instantiation of the particular talkgroup and instructing the particular communications device to begin participating in the particular talkgroup.

10. The system of claim 1 wherein the talkgroup management system configured to cause, as a consequence of processing the request to instantiate the particular talkgroup and based on the stored information identifying the particular talkgroup within the set as being the priority talkgroup for the particular communications device, the at least one node to transmit a communication for the particular communications device announcing the instantiation of the particular talkgroup comprises a talkgroup management system configured to cause, as a consequence of processing the request to instantiate the particular talkgroup and based on the stored information identifying the particular talkgroup within the set as being the priority talkgroup for the particular communications device, the at least one node to transmit a communication for the particular communications device announcing the instantiation of the particular talkgroup at a time when the particular communications device is participating in a different talkgroup.

11. The system of claim 1 wherein the talkgroup management system is further configured to:
store, in computer-accessible storage, information identifying a set of communications devices for which the particular talkgroup is designated as being the priority talkgroup, the set of communications devices including the particular communications device; and
cause, as a consequence of processing the request to instantiate the particular talkgroup and based on the stored information identifying the set of communications devices for which the particular talkgroup is designated as being the priority talkgroup, one or more nodes of the communications network to transmit communications for the communications devices of the set of communications device announcing the instantiation of the particular talkgroup.

12. A method comprising:
supporting multiple talkgroups for exchanging group communications across a communications network having one or more nodes for transmitting wireless communications to and receiving wireless communications from wireless communications devices, individual talkgroups enabling wireless communications devices designated as being members of corresponding ones of the individual talkgroups to exchange group communications with each other across the communications network;
storing, in computer-accessible storage, information designating a set of talkgroups as talkgroups of which a particular communications device is a member and identifying a particular talkgroup within the set as being a priority talkgroup for the particular communications device;
receiving a request to instantiate the particular talkgroup; and
causing, in response to receiving the request to instantiate the particular talkgroup and based on the stored information identifying the particular talkgroup within the set as being the priority talkgroup for the particular communications device, at least one node to transmit a communication for the particular communications device announcing the instantiation of the particular talkgroup.

13. The method of claim 12 wherein:
the communications network comprises a satellite communications network; and
the one or more nodes for transmitting wireless communications to and receiving wireless communications from wireless communications devices include a satellite for transmitting wireless communications to and receiving wireless communications from wireless communications devices.

14. The method of claim 12 further comprising instantiating the particular talkgroup in response to receiving the request to instantiate the particular talkgroup.

15. The method of claim 14 wherein instantiating the particular talkgroup comprises causing one or more nodes of the communications network to establish one or more corresponding channels between the one or more nodes and wireless communications devices designated as being members of the particular talkgroup, the one or more corresponding channels enabling the wireless communications devices designated as being members of the particular talkgroup to exchange group communications with each other across the communications network.

16. The method of claim 12 wherein causing the at least one node to transmit a communication for the particular communications device announcing the instantiation of the particular talkgroup comprises causing the at least one node to transmit a communication for the particular communications device announcing the instantiation of the particular talkgroup at a time when the particular communications device is participating in a different talkgroup.

17. The method of claim 12 further comprising:
storing, in computer-accessible storage, information identifying a set of communications devices for which the particular talkgroup is designated as being the priority talkgroup, the set of communications devices including the particular communications device; and
causing, in response to receiving the request to instantiate the particular talkgroup and based on the stored information identifying the set of communications devices for which the particular talkgroup is designated as being the priority talkgroup, one or more nodes of the communications network to transmit communications for the communications devices of the set of communications device announcing the instantiation of the particular talkgroup.

18. A non-transitory, computer-readable medium storing computer-readable instructions that, when executed by one or more processing elements, cause the one or more processing elements to:
- support multiple talkgroups for exchanging group communications across a communications network having one or more nodes for transmitting wireless communications to and receiving wireless communications from wireless communications devices, individual talkgroups enabling wireless communications devices designated as being members of corresponding ones of the individual talkgroups to exchange group communications with each other across the communications network;
- store, in computer-accessible storage, information designating a set of talkgroups as talkgroups of which a particular communications device is a member and identifying a particular talkgroup within the set as being a priority talkgroup for the particular communications device;
- process a request to instantiate the particular talkgroup; and
- cause, as a consequence of processing the request to instantiate the particular talkgroup and based on the stored information identifying the particular talkgroup within the set as being the priority talkgroup for the particular communications device, the at least one node to transmit a communication for the particular communications device announcing the instantiation of the particular talkgroup.

19. The computer-readable medium of claim 18 wherein:
- the communications network comprises a satellite communications network; and
- the one or more nodes for transmitting wireless communications to and receiving wireless communications from wireless communications devices include a satellite for transmitting wireless communications to and receiving wireless communications from wireless communications devices.

20. The computer-readable medium of claim 18 further storing instructions that, when executed by one or more processing elements, cause the one or more processing elements to instantiate the particular talkgroup as a consequence of processing the request to instantiate the particular talkgroup.

21. The computer-readable medium of claim 20 wherein the instructions that, when executed by one or more processing elements, cause the one or more processing elements to instantiate the particular talkgroup include instructions that, when executed by the one or more processing elements, cause the one or more processing elements to cause one or more nodes of the communications network to establish one or more corresponding channels between the one or more nodes and wireless communications devices designated as being members of the particular talkgroup, the one or more corresponding channels enabling the wireless communications devices designated as being members of the particular talkgroup to exchange group communications with each other across the communications network.

22. The computer-readable medium of claim 18 wherein the instructions that, when executed by one or more processing elements, cause the one or more processing elements to cause, as a consequence of processing the request to instantiate the particular talkgroup and based on the stored information identifying the particular talkgroup within the set as being the priority talkgroup for the particular communications device, the at least one node to transmit a communication for the particular communications device announcing the instantiation of the particular talkgroup include instructions that, when executed by one or more processing elements, cause the one or more processing elements to cause, as a consequence of processing the request to instantiate the particular talkgroup and based on the stored information identifying the particular talkgroup within the set as being the priority talkgroup for the particular communications device, the at least one node to transmit a communication for the particular communications device announcing the instantiation of the particular talkgroup at a time when the particular communications device is participating in a different talkgroup.

23. The computer-readable medium of claim 18 further storing instructions that, when executed by one or more processing elements, cause the one or more processing elements to:
- store, in computer-accessible storage, information identifying a set of communications devices for which the particular talkgroup is designated as being the priority talkgroup, the set of communications devices including the particular communications device; and
- cause, as a consequence of processing the request to instantiate the particular talkgroup and based on the stored information identifying the set of communications devices for which the particular talkgroup is designated as being the priority talkgroup, one or more nodes of the communications network to transmit communications for the communications devices of the set of communications devices announcing the instantiation of the particular talkgroup.

* * * * *